United States Patent
Agrawal et al.

(10) Patent No.: US 10,339,212 B2
(45) Date of Patent: Jul. 2, 2019

(54) DETECTING THE BOUNDS OF BORDERLESS TABLES IN FIXED-FORMAT STRUCTURED DOCUMENTS USING MACHINE LEARNING

(71) Applicant: Adobe Inc., San Jose, CA (US)

(72) Inventors: Ram Bhushan Agrawal, Noida (IN); Himanshu Mittal, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/675,873

(22) Filed: Aug. 14, 2017

(65) Prior Publication Data

US 2019/0050381 A1 Feb. 14, 2019

(51) Int. Cl.
  *G06F 17/24* (2006.01)
  *G06F 17/22* (2006.01)
  *G06N 3/04* (2006.01)

(52) U.S. Cl.
  CPC ........ *G06F 17/245* (2013.01); *G06F 17/2247* (2013.01); *G06N 3/04* (2013.01)

(58) Field of Classification Search
  CPC ...... G06F 17/245; G06F 17/2247; G06N 3/04
  USPC ................................ 715/227, 243, 246, 247
  See application file for complete search history.

(56) References Cited

U.S. PATENT DOCUMENTS

| | | | | |
|---|---|---|---|---|
| 5,321,770 A * | 6/1994 | Huttenlocher | ..... | G06K 9/00463 382/174 |
| 5,485,566 A * | 1/1996 | Rahgozar | ........... | G06K 9/00463 382/175 |
| 5,737,442 A * | 4/1998 | Alam | ................. | G06K 9/00449 382/175 |
| 5,881,381 A * | 3/1999 | Yamashita | ............ | G06F 17/246 715/209 |
| 6,006,240 A * | 12/1999 | Handley | ............ | G06K 9/00449 715/212 |
| 9,251,614 B1 * | 2/2016 | Tian | ...................... | G06K 9/4604 |
| 2006/0242553 A1 * | 10/2006 | Kulas | .................... | G06F 16/951 715/206 |
| 2007/0150494 A1 * | 6/2007 | Harrington | ......... | G06F 17/2247 |
| 2007/0196015 A1 * | 8/2007 | Meunier | ............. | G06F 17/2745 382/190 |

(Continued)

FOREIGN PATENT DOCUMENTS

WO     WO-03098370 A2 *  11/2003  ......... G06F 17/2205

OTHER PUBLICATIONS

"Logistic Regression;" Unsupervised Feature Learning and Deep Learning Tutorial; May 21, 2016; Stanford.edu; pp. 1-2.*

*Primary Examiner* — Andrew R Dyer
(74) *Attorney, Agent, or Firm* — Finch & Maloney PLLC

(57) ABSTRACT

Techniques are disclosed for detecting the bounds of borderless open tables in fixed-format structured documents, such as PDF documents, and grouping text lines into predicted borderless tables. The target document comprises a set of text lines each having a respective vertical and horizontal position in the target document. A sorted list of the text lines is generated based upon a vertical and horizontal position of each text line in the target document. For each text line in the sorted list, a respective probability that the text line in the sorted list belongs to a borderless table is then determined. According to one embodiment, the probability may be determined using a classifier that may employ a logistic regression algorithm.

18 Claims, 12 Drawing Sheets

(56) References Cited

U.S. PATENT DOCUMENTS

| | | | |
|---|---|---|---|
| 2007/0288539 A1* | 12/2007 | Vion-Dury | G06T 11/203 |
| | | | 708/200 |
| 2008/0040513 A1* | 2/2008 | Asakawa | G06F 9/451 |
| | | | 710/1 |
| 2012/0324341 A1* | 12/2012 | Dejean | G06F 17/211 |
| | | | 715/243 |

* cited by examiner

| In Millions | Shares | Price | Comments |
|---|---|---|---|
| UAP Stock | | | Sample data |
| Granted | 66634 | 202.4 | to show how |
| Exercised | 34555 | 98.3 | to detect an open |
| Cancelled | 2333 | 123.5 | table in a fixed format |
| Adjustments | 1003 | 200.1 | structure document |
| | 23 | 228.7 | |
| Total | 788876 | 1000 | |

$\sum s_l$

FIG. 3b

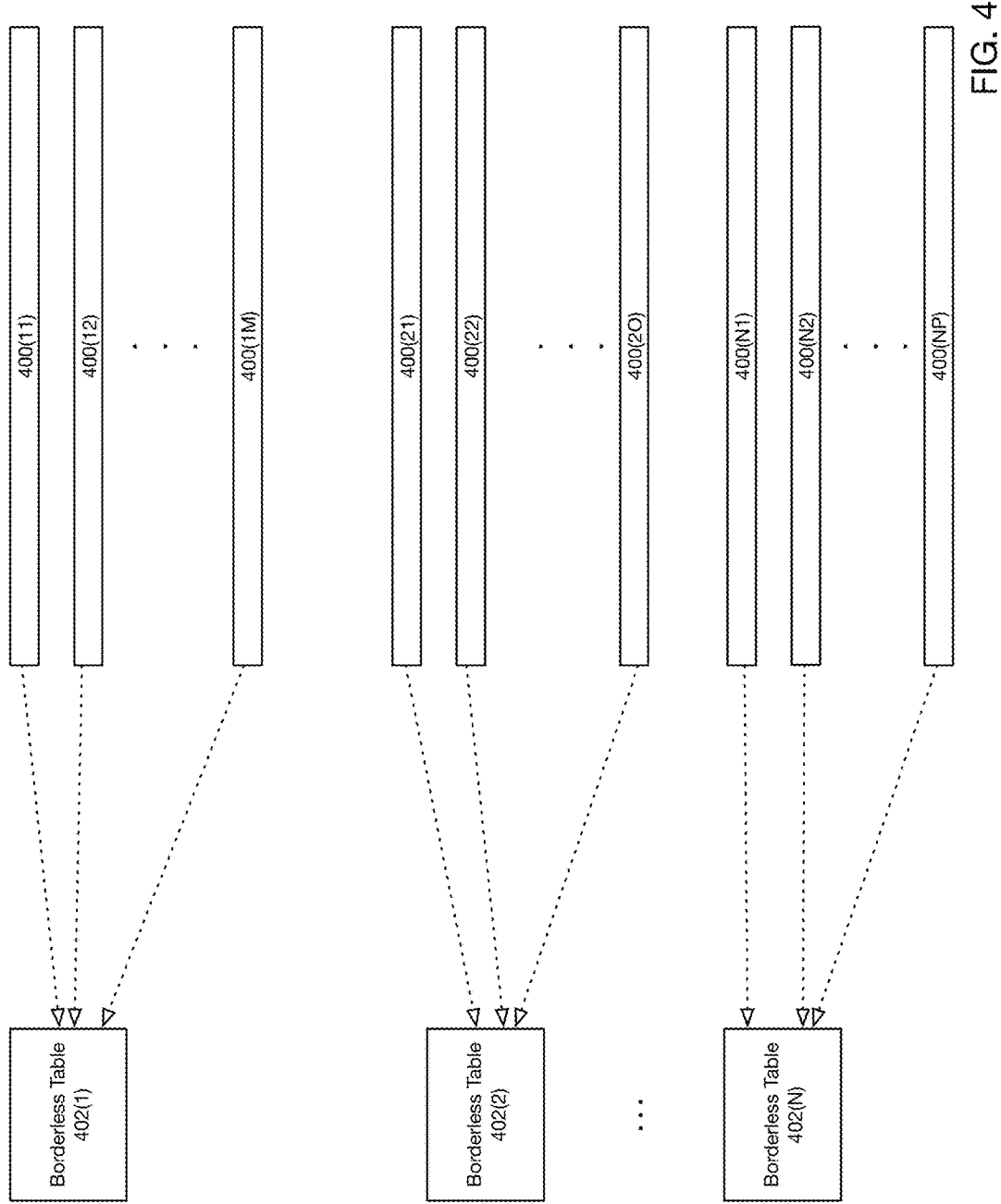

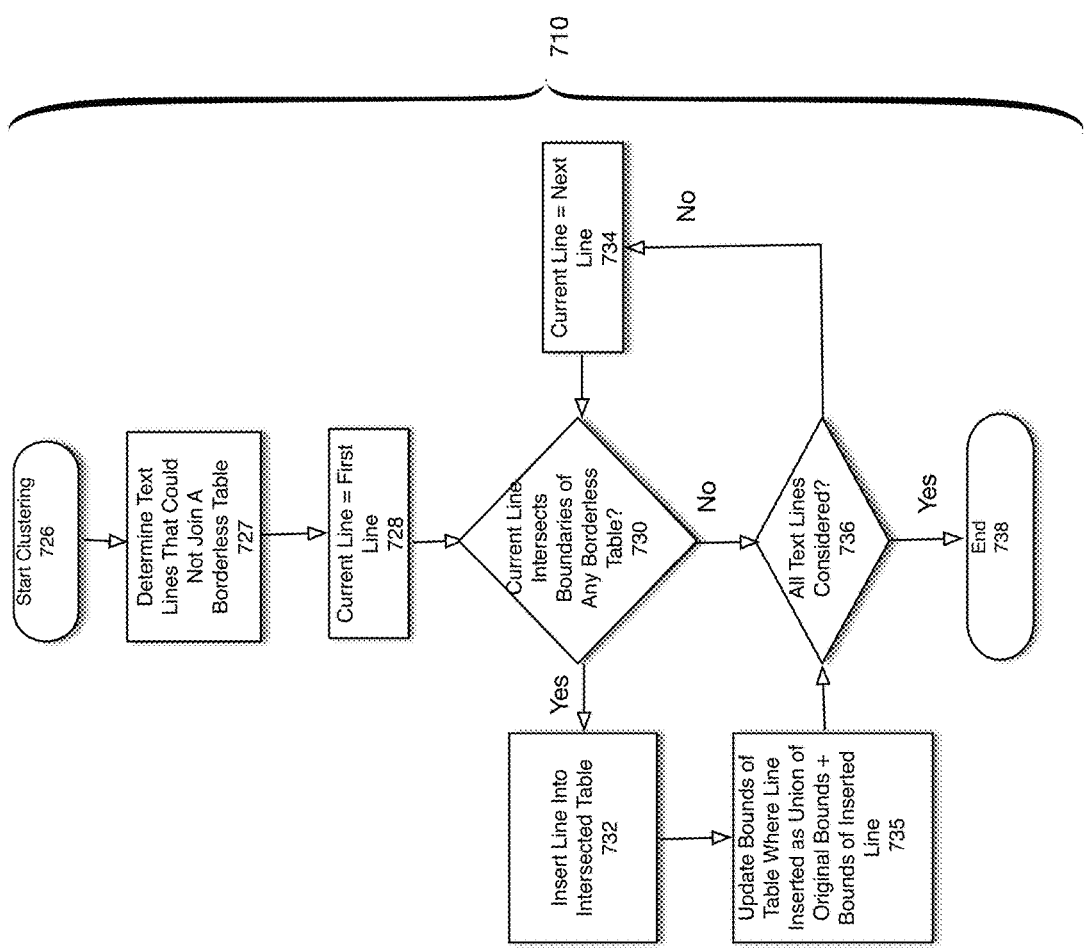

DETECTING THE BOUNDS OF BORDERLESS TABLES IN FIXED-FORMAT STRUCTURED DOCUMENTS USING MACHINE LEARNING

FIELD OF THE DISCLOSURE

This disclosure relates to techniques for detecting the bounds of borderless tables in "fixed-format" structured documents and in particular for associating text lines with particular borderless tables in these types of documents.

BACKGROUND

Fixed-format structured documents, sometimes called fixed-layout flat documents, are documents in which the contents within documents are specified based on its properties and location on the page and not on the basis of a document structure (i.e., a hierarchical tree consisting of paragraphs, lists, tables etc.). PDF documents, which are ubiquitous, are one such example of fixed-format structured documents and are considered the de-facto standard for document exchange, collaboration and archival. However, the lack of formatting data gives rise to some non-trivial issues when working with these types of documents. In particular, PDF structure information is needed in many typical workflows related to PDF processing, such as: making a given PDF accessible (for screen reading, for example); executing a PDF reflow and other PDF content interactivity provided by current and future generation PDF tools; executing a PDF editing feature; and executing a PDF compare feature, to name a few examples.

One solution to address such issues involved a concept of PDF accessibility tags, which try to circumvent this problem to some extent. However, the number of untagged PDFs (or poorly or otherwise inadequately tagged PDFs) present in the real world is so large that it is still a critical problem to correctly "detect" the structure of a PDF document. Known techniques exist for automatic structure detection and creation of tags in untagged PDFs. The bounding box algorithm is a backend engine used for structure recognition for the PDF editing feature. However, while existing solutions for PDF structure recognition are effective on simple content types like paragraphs, lists, and bordered tables, they perform poorly in detecting complex types, such as borderless tables (also referred as 'open table' interchangeably hereafter). To this end, the present disclosure relates to techniques for solving the challenging aspect of borderless table detection within fixed-format structured documents, such as a PDF document.

BRIEF DESCRIPTION OF THE DRAWINGS

FIG. 3b illustrates a soft line feature usable to classify a text line as belonging to a borderless table according to one embodiment of the present disclosure.

FIG. 4 depicts an association of borderless table text lines with borderless table objects according to one embodiment of the present disclosure.

FIG. 7b is a flowchart of a process for performing post-processing of low confidence text line objects according to one embodiment of the present disclosure.

DETAILED DESCRIPTION

Techniques are described herein for detecting bounds of borderless tables in a fixed-format structured document, such as a PDF document. As used herein, PDF document or other fixed-format structured document generally comprises a set of text lines each having a respective vertical and horizontal position in the PDF document. According to an embodiment of the present disclosure, a sorted list of the text lines is generated based upon a vertical and horizontal position of each text line in a given PDF document. For each text line in the sorted list, a respective probability that the text line belongs to a borderless table is then determined. According to some embodiments, the probability may be determined using a classifier that employs a logistic regression algorithm, although other suitable classification algorithms can be used as will be appreciated. Based upon the respective generated probabilities for each of the text lines, a candidate set of borderless table lines comprising a subset of the text lines is determined. A clustering operation is then performed on the candidate set to associate each of the text lines in the candidate set with a respective borderless table object. Text lines associated with a lower probability than a predetermined threshold may then subsequently be associated with borderless table objects based upon whether they intersect previously detected borderless tables. The techniques can be applied to any number of fixed-format structured documents, as will be appreciated.

Figure 1:
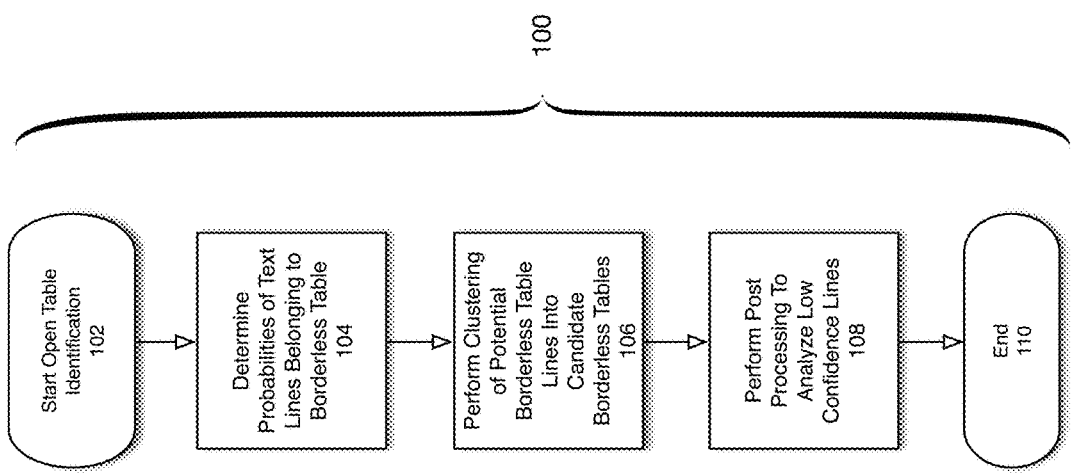
FIG. 1 is a flowchart depicting a process for detecting bounds of borderless tables in a fixed-format structured document according to one embodiment of the present disclosure.

FIG. 1 is a flowchart depicting a process for detecting bounds of borderless tables in a fixed-format structured document according to one embodiment of the present disclosure. For purposes of this example embodiment, assume the fixed-format structured document is a PDF document. Note, however, that any other fixed-format structured documents can be processed using the disclosed techniques, and the present disclosure is not intended to be limited to PDF documents. The example process 100 is initiated in 102. In 104, for each text line in the PDF document, a respective probability is determined that the line belongs to a borderless table. According to one such embodiment, the probability of a text line belonging to a borderless table may be determined using a logistic regression process (described below). Each respective probability associated with a text line indicates a potential likelihood that the text line is part of a borderless table line. Thereby, according to one embodiment, text lines having probabilities exceeding a given threshold may comprise a set of candidate borderless table lines, i.e., those lines having sufficient likelihood of belonging to a borderless table. For purposes of this discussion, text lines determined to hold sufficiently high probability to belong to a borderless table in this step will be referred to as "high confidence borderless table lines". Text lines failing to have sufficient probability will be referred to as "low confidence borderless table lines".

Based upon the probabilities determined in 104, in 106, a clustering operation is performed to associate high confidence text lines with particular borderless table objects. Techniques and particular embodiments for performing such a clustering operation are described below with respect to FIG. 7a. In 108, a post-processing step is performed to address low confidence lines (e.g., lines having a probability falling below a particular threshold, thereby indicative that the text line may not belong to a particular borderless table). In this post-processing step, a portion of the low confidence text lines may be associated with borderless table objects. Examples of methods for performing this post-processing step are described below with respect to FIG. 7b. The process ends in 110.

As previously described at 104, according to one embodiment classification of text lines having low or high confidence may be identified using a classifier that, for example, utilizes a logistic regression process. As will be understood, a logistic regression process may be trained using a training set to determine a set of parameters characterizing the classification of an input with respect to a plurality of classes. In particular, the output of a logistic regression process may be described as:

$$h_\theta = g(\theta^T x)$$

where $\theta$ is a parameter vector, x is an input vector and g is a logistic function. In particular, g may be the sigmoid function:

$$g(h_\theta) = \frac{1}{1 + e^{-h_\theta}}$$

Figure 2:
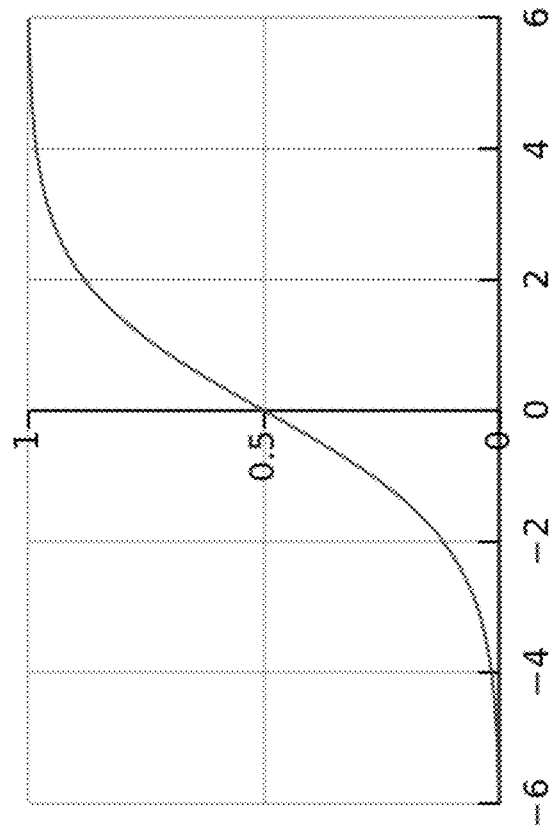
FIG. 2 shows a plot of the sigmoid function according to one embodiment of the present disclosure.

FIG. 2 shows a plot of the sigmoid function according to one embodiment of the present disclosure. The x-axis is the value $h_\theta$, which is the output of a logistic function, which is a dimensionless quantity. The y-axis represents a probability and in this instance may be interpreted as a probability that an input belongs to a particular class, which in this instance is a borderless table line. In other words, in this instance, the sigmoid activation function indicates the probability that a particular line is in fact a borderless table line. During a training process, the parameters $\theta$ may be learned utilizing an optimization process (e.g., gradient descent).

Although the embodiments described herein utilize a logistic regression based classifier, it will be understood that many other methods exist for determining a confidence or probability that a text line is a borderless table line. For example, according to alternative embodiments a deep neural network ("DNN") or support vector machine ("SVM") may be employed as well as a host of other alternatives.

Figure 3A:
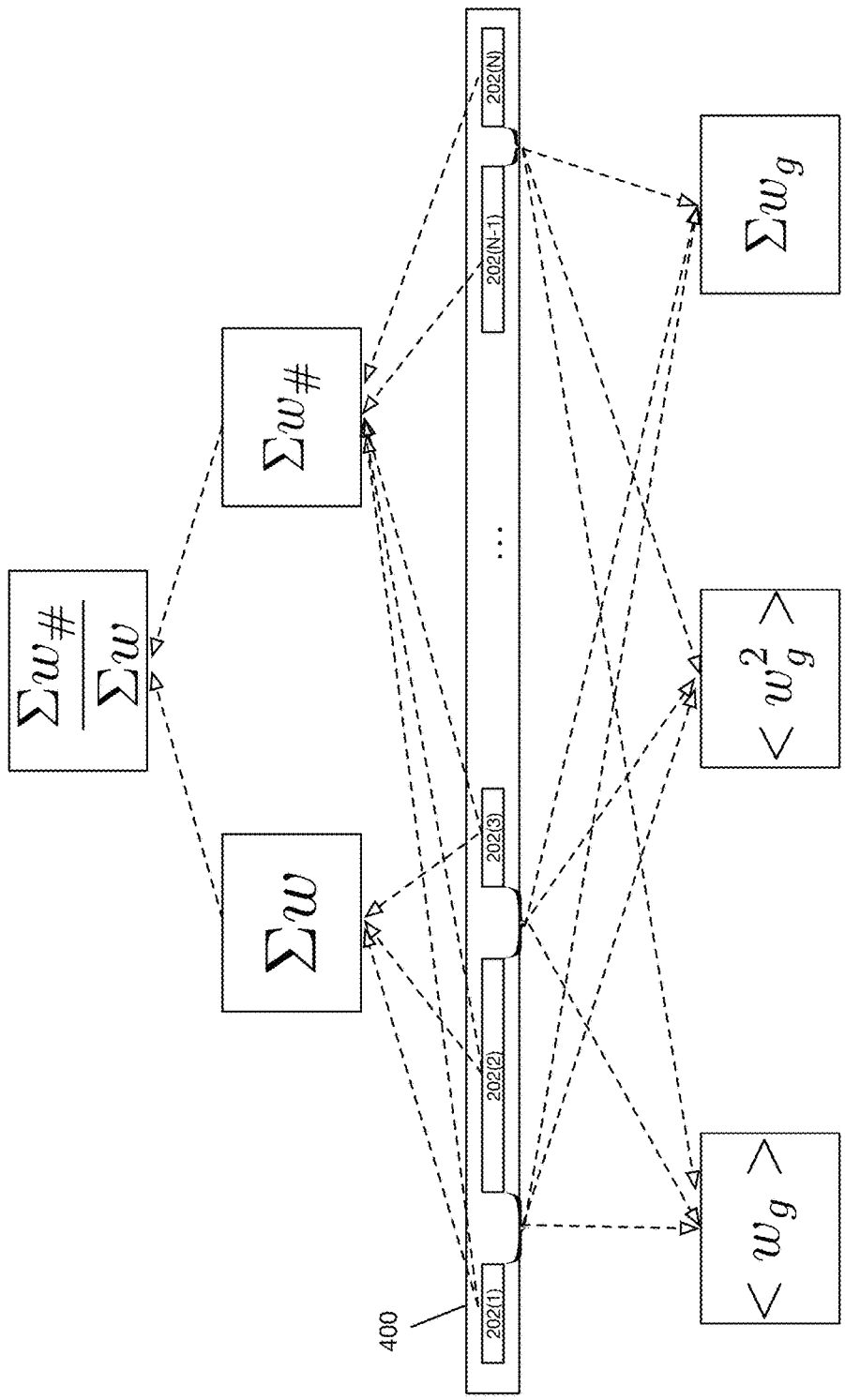
FIG. 3a illustrates a schematic of a set of features usable to determine a confidence that a text line is a borderless table line according to one embodiment of the present disclosure.

FIG. 3a illustrates a schematic of a set of features that may be utilized to determine a confidence that a text line is a borderless table line according to one embodiment of the present disclosure. FIG. 3a depicts a structure of a single text line 400. It will be understood that a PDF document or any other fixed-format structured document will typically be comprised of a plurality of text lines 400(1)-400(N), as illustrated in FIG. 4. The document may further include components as well such as images, graphics, embedded video, and hyperlinks. As depicted in FIG. 3a, each text line may be composed of a series of words 202(1)-202(N). Methods for detecting text lines 400 in a PDF document or any other fixed-format structured document will be described below.

According to one embodiment, a set of features indicative of a text line 400 belonging to a borderless table may be defined. In one example scenario, each text line 400 in a given PDF document exhibits a set of features such as the number of words on the line, the average word length, the average spacing between words (word gap), and the variance of word gaps. These features may then be utilized by a classifier to classify whether that text line 400 belongs to a borderless table.

FIG. 3a illustrates various example features that may be used to classify a text line as belonging to a borderless table. As shown in FIG. 3a, these features may include:

mean word gap $<w_g>$ (i.e., the average spacing between words), variation in word gap (i.e., standard deviation of word gap) $<w_g^2>$, sum of word gaps $\Sigma w_g$, number of words containing primarily digits $\Sigma w_\#$ (e.g., fewer letters than numbers), ratio of words with digits to total words $$\frac{\Sigma w_\#}{\Sigma w},$$

and number of soft lines intersecting a text line $\Sigma s_l$ (described below with respect to FIG. 3b).

It will be understood that these described features are not exhaustive and are only illustrative examples. Many other features may be defined and utilized to classify text lines as belonging to a borderless table. Other features may include, for instance, font size, font type, punctuation, grammatical structure (e.g., usages of nouns, verbs, and transitional words), capitalization, proximity to a non-textual object (e.g., image, graphic, video), the length of the target text line, the presence and length of neighboring text lines above and below the target sentence, the presence of detectable formatting such as indentations, tabs, bullet points, and page breaks. In a more general sense, text lines in borderless tables oftentimes have different or otherwise unique spacing (e.g., large white spaces between certain words) and terse grammatical structure (e.g., low transitional word count, no verbs or no nouns, no punctuation, or otherwise abbreviated structure), relative to such features of textual content that is not in a table (e.g., textual paragraphs). Any such features, whether alone or in combination, can be used to identify text lines of a borderless table. In particular, it will be understood in the fields of machine learning and deep neural nets that a set of features may be utilized to train a neural network to perform classification. For example, a set of training examples utilizing a pre-determined set of features is provided to the neural net along with a respective target value for each training example. In this example instance, a target value would be a binary value that indicates whether the text line corresponding to the set of features is in fact a borderless table line (logical 1) or not (logical 0). These training examples may be utilized to determine a set of parameters θ for the network that minimize a cost function. The parameters may be determined over the set of training examples using known algorithms such as stochastic gradient descent in conjunction with the backpropagation algorithm, for example.

FIG. 3b illustrates a soft line feature that may be utilized to classify a text line as belonging to a borderless table according to one embodiment of the present disclosure. The soft line feature depicted in FIG. 3b may be utilized in conjunction with other features, such as those described above, to classify a text line as belonging to a borderless table. As shown in FIG. 3b, a soft line may be defined as an imaginary white-space element that is generated when multiple white spaces between words on different lines are aligned vertically. Thus, FIG. 3b shows 3 soft lines, 302(1)-302(3). Note in this example embodiment that a text line generally runs left to right on a single line. Other embodiments may run right to left and/or include multiple lines. According to one embodiment, the number of soft lines intersecting a particular text line $\Sigma s_1$ may be a detected feature utilized as input to a classifier (among other features) for classifying that a text line belongs to a borderless table. Continuing with the example shown in FIG. 3b, soft lines 302(1)-302(3) intersect all text lines shown at 3 points. Further note that this example includes seven text lines, including the header line and the total line, and the five intervening lines. Thus, according to this example embodiment, the value of $\Sigma s_1$ would be 3. The number of soft lines detected is yet another feature that may be provided to a classifier to determine whether a text line is in fact a borderless table line.

FIG. 4 depicts an association of candidate borderless table lines with borderless table objects according to one embodiment of the present disclosure. As will be understood, borderless table objects (e.g., 402(1)-402(N)) are software structures or objects utilized to refer to and characterize actual borderless table objects detected within a target PDF document (or other fixed-format structured document, as the case may be). As will be described below with respect to FIG. 7a, during a clustering process, each identified text line in the target PDF document may be associated with a borderless table object (e.g., 402(1)-402(N)). The structure and nature of a borderless table object 402 will be described below. For purposes of the present discussion, it is sufficient to understand that a borderless table object 402 comprises a software object or structure for associating text line objects 400 that lie within the same borderless table within a PDF document. Thus, as shown in the example embodiment of FIG. 4, after a candidate line identification process has been performed (see FIG. 7a and accompanying discussion), text lines 400(11)-400(1M) are associated with borderless table object 402(1). Similarly, text lines 400(21)-400(2O) are associated with borderless table object 402(2) and text lines 400(N1)-400(NP) are associated with borderless table object 402(N).

Figure 5:
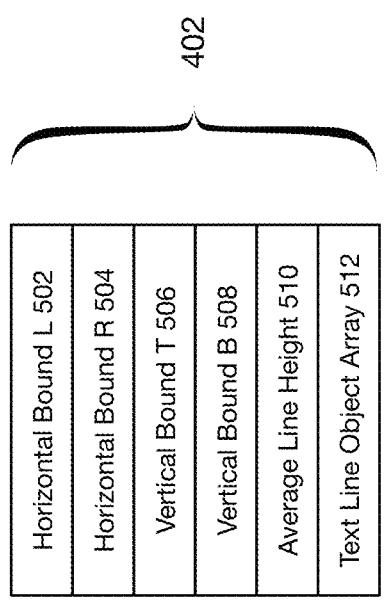
FIG. 5 depicts a data structure for representing a borderless table object according to one embodiment of the present disclosure.

FIG. 5 depicts a data structure for representing a borderless table object according to one embodiment of the present disclosure. As shown in FIG. 5, borderless table object 402 comprises horizontal bound L property 502, horizontal bound R property 504, vertical bound T property 506, vertical bound B property 508, average line height property 510, and text line object array 512. Horizontal bound L property 502 represents a left boundary for a borderless table represented by borderless table object 402. Similarly, horizontal bound R property 504, vertical bound T property 506, and vertical bound B property 508 respectively represent a right boundary, a top boundary, and a bottom boundary for a borderless table represented by borderless table object 402. Average line height property 510 may indicate an average height for all text lines 400 associated with borderless table object 402. Finally, text line object array 512 may store a reference to a set of text lines 400 associated with borderless table object 402. That is, text line object array 512 may store an array of candidate text lines 400 determined, for example, by processes described with respect to FIGS. 7a-7b for associating particular text lines 400 with borderless table objects (see, for example, FIG. 4 and the respective description).

Figure 6:
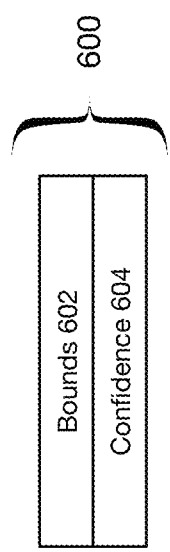
FIG. 6 depicts a data structure for representing a text line object according to one embodiment of the present disclosure.

FIG. 6 depicts a data structure for representing a text line according to one embodiment of the present disclosure. Text line object 600 comprises bounds property 602 and confidence property 604. According to some embodiments of the present disclosure, bounds property 602 stores top, bottom, left, and right boundaries for a text line. According to one such embodiment, confidence property 604 is a number that represents the confidence that the text line 400 represented by text line object 600 belongs to a borderless table. For example, confidence property 604 may be a real number between 0 and 1 indicating a probability that the associated text line 400 belongs to a borderless table. The closer the real number is to 1, the greater the probability.

Figure 7A:
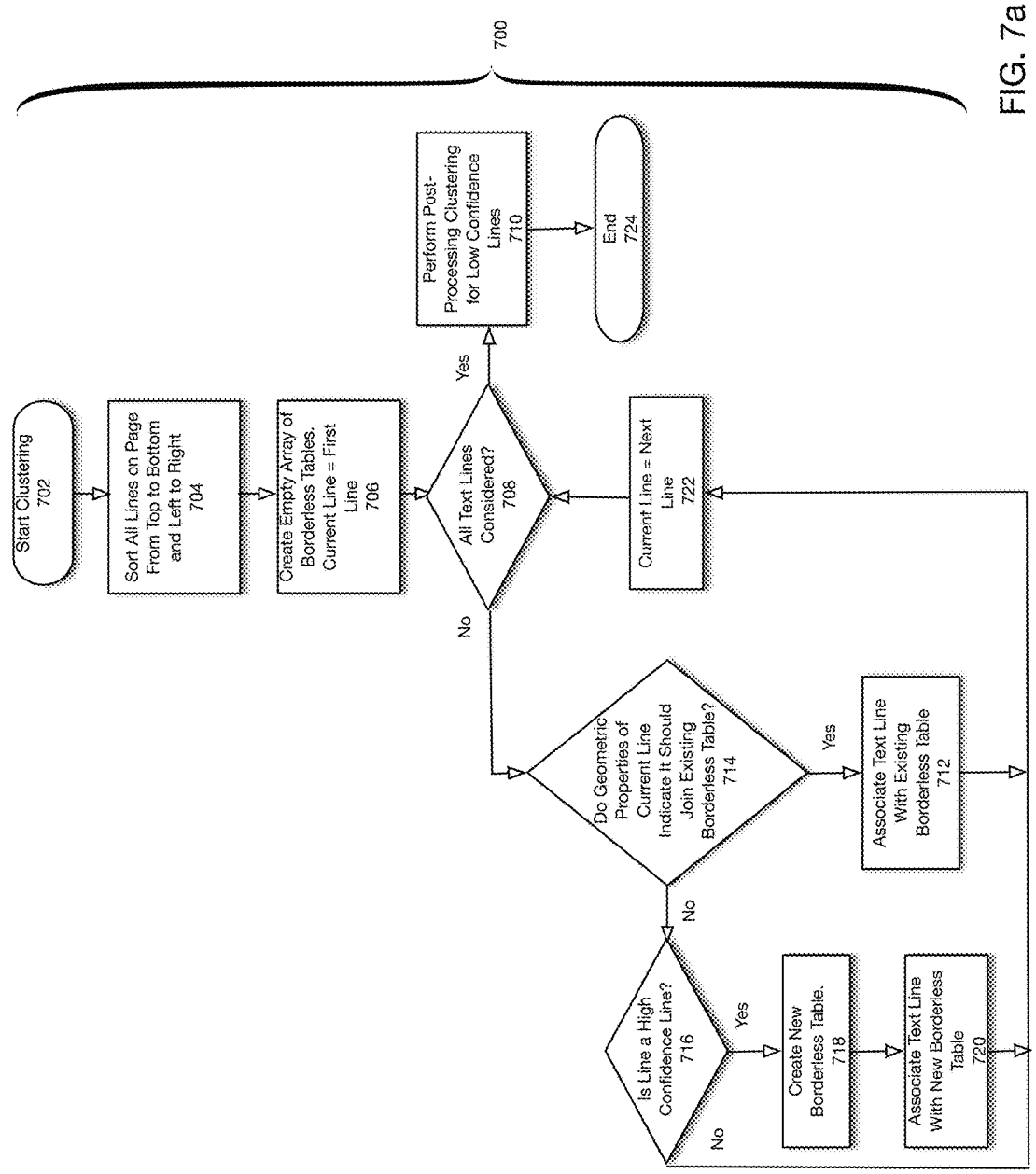
FIG. 7a is a flowchart of a process for clustering of text lines with borderless table objects according to one embodiment of the present disclosure.

FIG. 7a is a flowchart of a process for clustering of text lines with one or more borderless table objects according to one embodiment of the present disclosure. The process shown in FIG. 7a may be performed as a first step in identifying candidate borderless table text lines 400 and associating those text lines 400 with particular borderless table objects 402. It is assumed for purposes of this discussion that text lines 400 in a PDF document have been identified utilizing known methods and these text lines 400 have been associated with text line objects 600.

The process is initiated in 702. In 704, all text lines 400 on a page of a given PDF document (or other target fixed-format structured document) are sorted from top to bottom and from left to right. According to one embodiment, a quick sort ("qsort") algorithm may be employed, but any other sorting algorithm may be utilized. An example process for sorting text line objects 600 is described below with respect to FIG. 7c, according to some embodiments.

In 706 an empty array of borderless table objects 402 is created. A current line variable is then set to the first text line object 600 in the PDF document. In 708 it is determined whether all text line objects 600 have been considered. If so ('Yes' branch of 708), in 710 a post-process clustering process is performed for low confidence lines (see FIG. 7b and accompanying discussion). As will be appreciated in light of this disclosure, low confidence lines refer to text line objects having an associated confidence value falling below a predetermined threshold. The process then ends in 724.

If all text line objects 600 have not been considered ('No' branch of 708), then flow continues with 714 in which it is determined whether the geometric properties of the current text line object 600 indicate it can join an existing borderless table object 402. In order to determine whether this criterion is satisfied, any number of heuristics may be applied. According to one example such embodiment, the following criteria may be utilized to determine whether a text line object 600 should be associated with an existing borderless table object 402:

Determine whether the text line object 600 has a confidence score greater than a predetermined threshold. According to one such embodiment, the predetermined threshold is 0.5, i.e., greater than equal likelihood of belonging to and not belonging to.

Determine whether the text line object 600 has some horizontal overlap with the bounds of an existing borderless table object 402. According to one such embodiment this criterion is satisfied if $$\text{Max(LeftLine,LeftTable)} < \text{Min(RightLine,RightTable)}$$

where LeftLine/RightLine refer to the left and right boundaries respectively of the current text line object 600 being considered while LeftTable/RightTable refer to the left and right boundaries respectively of the borderless table object under consideration.

Determine whether the text line object 600 falls below a borderless table bound. According to one such embodiment, this criterion is satisfied if the Y value of the center of the text line object 600 falls below the Y value of the center of the borderless table object 402 under consideration.

Determine whether the height associated with the text line object 600 is approximately equal to those already associated with a borderless table object 402. According to one such embodiment, this criterion is satisfied if $0.5 \leq R \leq 2.0$ where $$R = \frac{HLineAvg}{HCurLine},$$

where HLineAvg is the average height of text lines in the borderless table currently under consideration and HCurLine is the height of the current text line.

Although there could be a few low-confidence text line objects 600 between a borderless table object 402 and the current text line object 600, the number of such low confidence text line objects 600 should be less than a predefined threshold. According to one such embodiment, a maximum of 2 low confidence lines may exist between high confidence lines.

It will be understood that according to various embodiments, any subset of these criteria as well as other criteria may be applied to determine whether a text line object 600 should be associated with a borderless table object 402. The important point is that some geometric property of a text line object 600 is utilized to determine its association with an existing borderless table object 402. If the heuristic is satisfied ('Yes' branch of 714), flow continues with 712 and the current text line object 600 is associated with the existing borderless table object 402. Flow then continues with 722 in which the current text line object 600 is set to the next text line object 600.

If the heuristic is not satisfied ('No' branch of 714), flow continues with 716 where it is determined whether the current text line object 600 is associated with a high confidence value. If so ('Yes' branch of 716), flow continues with 718 and a new borderless table object 402 is created. In 720 the current text line object 600 is then associated with the new borderless table 402 object created in 718. Flow continues with 722 in which the current text line object 600 is set to the next text line object 600.

If, on the other hand, the current text line object 600 is not associated with a high confidence value ('No' branch of 716), flow continues with 722, whereby the current text line is effectively ignored.

FIG. 7b is a flowchart of a process for performing clustering of low confidence text line objects according to one embodiment of the present disclosure. As previously described with respect to FIG. 7a, text lines 400 in a PDF document may be identified and classified based upon their probability of being associated with a borderless table. In further accordance with the process described with respect to FIG. 7a, these high confidence text line objects 600 may then be associated with particular borderless table objects 402. The process shown in FIG. 7b may then be performed to handle low confidence text line objects 600 that have not been associated with a borderless table object 402.

The clustering process commences in 726. In 727, all text line objects 600 that have not been associated with a borderless table object 402 are identified. In particular, these text line objects 400 may be text line objects 600 that are associated with a confidence value falling below a threshold. That is, the text line objects 600 processed via the process shown in FIG. 7b may be text line objects 600 that have previously been identified as having a low probability of belonging to a borderless table object, for example by virtue of the fact that such text line objects 600 do not meet one or more of the criteria for a borderless table text line. In 728, a current line pointer is set to point to the first text line object 600.

In 730, it is determined whether the text line 400 represented by the current text line object 600 intersects any boundaries of an existing borderless table object 402. As previously described with respect to FIG. 5, a borderless table object 402 comprises several attributes including horizontal bound L 502, horizontal bound R 504, vertical bound T 506, and vertical bound B 508, according to some embodiments. Similarly, each text line object 600 is associated with bounds 602 as shown in FIG. 6. If such an intersection is detected ('Yes' branch of 730), in 732 the intersected text line object 600 is associated with the intersecting borderless table object 402. If no such intersection is detected ('No' branch of 730), in 736 it is determined whether all text line objects 600 have been considered. If so ('Yes' branch of 738) flow continues with 738 and the process ends. Otherwise ('No' branch of 736), the current text line object 600 is set to the next text line object 600 in 734.

If the current text line object 600 intersects the boundaries of a borderless table 402 ('Yes' branch of 730), in 732, the intersected text line object 600 is associated with the intersecting borderless table object 402. Flow then continues with 735, wherein the boundaries of the interested borderless table 402 are updated as a union of the original boundaries (i.e., horizontal bound L 502, horizontal bound R 504, vertical bound T 506, and vertical bound B 508) and the bounds 602 of the inserted text line object 600. Flow then continues with 736.

Figure 7C:
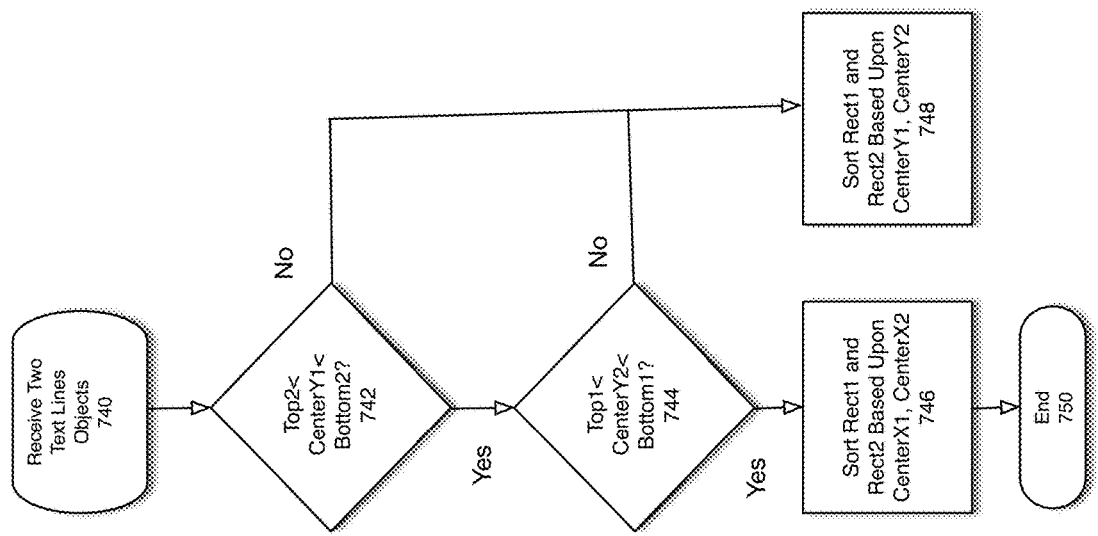
FIG. 7c depicts a process performed by a comparator for sorting two text lines according to one embodiment of the present disclosure.

According to one embodiment, a comparator function is defined that receives two text line objects 400 as input and generates an output indicating the order of the text line objects, for sorting purposes. FIG. 7c depicts a process performed by a comparator for sorting two text lines according to one embodiment of the present disclosure. The process is initiated in 740 whereby two text line objects 600 are received. As previously described, each text line object 600 is associated with a bounds property 602 that stores top, bottom, left, and right boundaries of a text line and therefore respectively define a first rectangle ("Rect1") and a second rectangle ("Rect2"). The vertical midpoints of Rect1 and Rect2 may be determined, for example, by respectively averaging the top and bottom boundaries of Rect1 and Rect2 forming CenterY1 and CenterY2. Similarly, the horizontal midpoints of Rect1 and Rect2 may be determined, for example, by respectively averaging the left and right boundaries of Rect1 and Rect2 forming CenterX1 and CenterX2.

For purposes of this discussion the tops of Rect1 and Rect2 will be referred to as Top1 and Top2 respectively while the bottoms of Rect1 and Rect2 will be referred to as Bottom1 and Bottom2 respectively.

Referring to FIG. 7c, in 742 if CenterY1 is between Top2 and Bottom2 and CenterY2, ('Yes' branch of 742), flow continues with 744 where it is determined whether CenterY2 is between the Top1 and Bottom1. If so ('Yes' Branch of 744), then the text lines 400 represented by the text line objects 500 are on the same reading line and flow continues with 746 whereby CenterX1 and CenterX2 are utilized to sort the text lines based on their horizontal position. If Rect1 and Rect2 are not on the same reading line ('No' branch of 742 or 'No' branch of 744), then they are sorted based on CenterY1 and CenterY2 in 748. The process ends in 750.

Figure 8A:
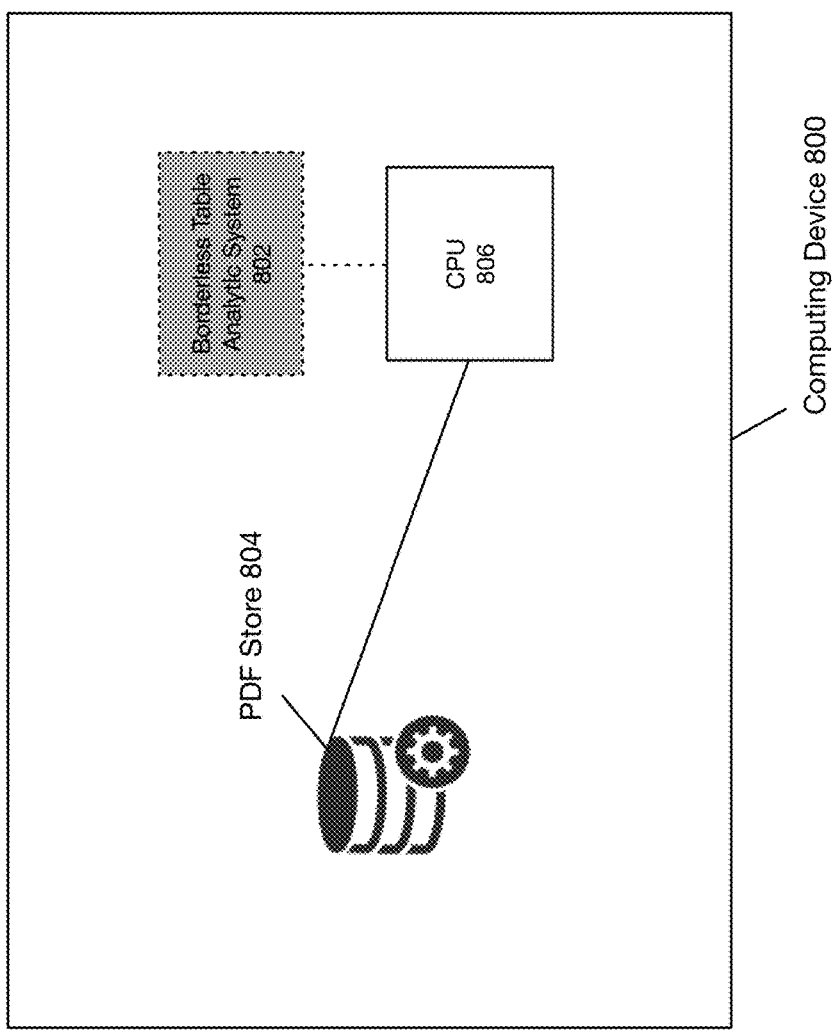
FIG. 8a illustrates an example computing system that executes a borderless table analytic system in accordance with one embodiment of the present disclosure.

FIG. 8a illustrates an example computing system that executes a borderless table analytic system in accordance with one embodiment of the present disclosure. As depicted in FIG. 8a, computing device 800 includes CPU 806 and PDF store 804, which may be implemented with any suitable technologies. In addition, borderless table analytic system 802 may be understood to be a programmatic structure for carrying out borderless table detection as described herein. In particular, CPU 806 may be further configured via programmatic instructions to execute a borderless table detection system (as variously described herein, such as with respect to FIGS. 7a-7c). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. For instance, PDF store 804 may be external to the computing device 800. Computing device 800 can be any stand-alone computing platform, such as a desk top or work station computer, laptop computer, tablet computer, smart phone or personal digital assistant, game console, set-top box, or other suitable computing platform.

Figure 8B:
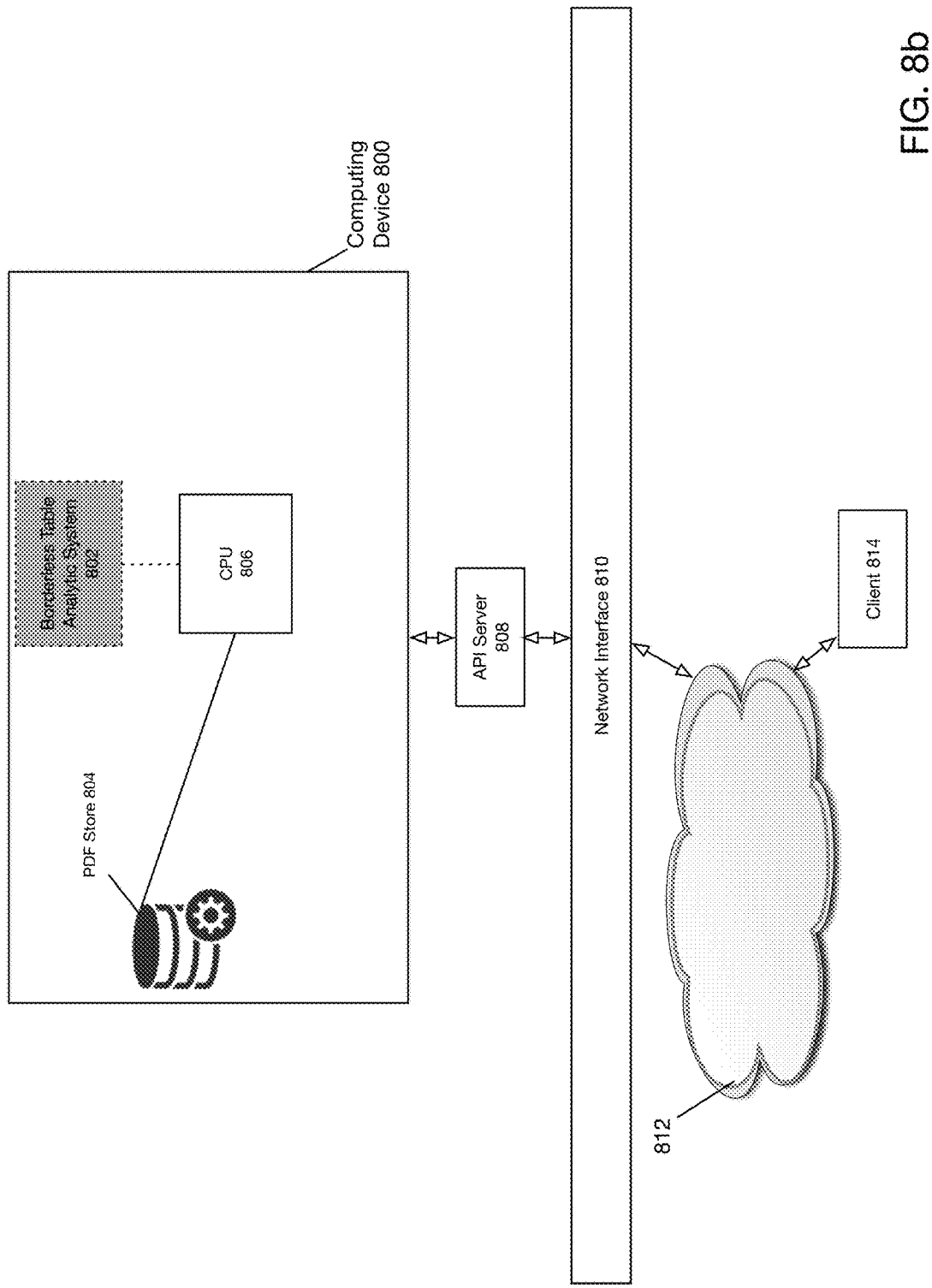
FIG. 8b illustrates an example integration of a borderless table analytic system into a network environment according to one embodiment of the present disclosure.

FIG. 8b illustrates an example integration of a borderless table analytic system into a network environment according to one embodiment of the present disclosure. As depicted in FIG. 8b, computing device 800 may be collocated in a cloud environment, data center, local area network ("LAN") etc. Computing device 800 shown in FIG. 8b is structured identically to the example embodiment described with respect to FIG. 8a. In this instance, computing device 800 may be a server or server cluster, for example. As shown in FIG. 8b, client 814 interacts with computing device 800 via network 812. In particular, client 814 may submit PDF documents (or any other fixed-format structured document, as will be appreciated in light of this disclosure) and received responses from borderless table analytics system 802 via API calls received at API server 808, which are transmitted via network 812 and network interface 810. It will be understood that network 812 may comprise any type of public and/or private network including the Internet and/or private LAN, or a campus-wide private network, and may employ wired and/or wireless communication protocols of any kind, as will be further appreciated.

Borderless table analytic system 802 and its various functional blocks may be implemented on a computing device such as a general-purpose or application specific CPU that includes one or more storage devices and/or non-transitory computer-readable media having encoded thereon one or more computer-executable instructions or software for implementing techniques as variously described in this disclosure. In some embodiments, the storage devices include a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device includes other types of memory as well, or combinations thereof. In one such embodiment, the storage device is provided on the computing device. In another such embodiment, the storage device is provided separately or remotely from the computing device. The non-transitory computer-readable media include, but are not limited to, one or more types of hardware memory, non-transitory tangible media (for example, one or more magnetic storage disks or tape, one or more optical disks, one or more USB flash drives), and the like. In some embodiments, the non-transitory computer-readable media included in the computing device store computer-readable and computer-executable instructions or software for implementing various embodiments. In one particular embodiment, the computer-readable media are provided on the computing device(s). In another embodiment, the computer-readable media are provided separately or remotely from the computing device.

It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device, can be integrated into, for example, one or more servers, desktop or laptop computers, workstations, tablets, smart phones, game consoles, set-top boxes, or other such computing devices.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent. Further note that a functional circuit that includes software also includes one or more processors for executing that software, thereby providing a special purpose processor-based system. The one or more processors may be distributed across multiple machines or local to a single machine. Numerous suitable processing environments will be apparent.

As will be appreciated in light of this disclosure, the various modules and components of creative platform 122 and specifically personalized creator recommendation system 122, may be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out.

FURTHER EXAMPLE EMBODIMENTS

The following examples pertain to further embodiments, from which numerous permutations and configurations will be apparent.

Example 1 is a computer implemented method for detecting borderless tables in a fixed-format structured document. The method includes generating a sorted list based upon a vertical position and horizontal position of a text line within said document, and performing a respective classification to determine a respective probability that said text line belongs to a borderless table. If said text line has a respective probability greater than a predetermined threshold, the method includes associating said text line with a borderless table object; and, if said text line has a respective probability less than said predetermined threshold, the method includes associating said text line with a borderless table object that intersects said text line.

Example 2 includes the subject matter of Example 1, wherein said borderless table object is associated with a first boundary property, wherein said first boundary property indicates a first top boundary, a first bottom boundary, a first left boundary and a first right boundary.

Example 3 includes the subject matter of Example 2, and further includes associating said text line with a second boundary property, wherein said second boundary property indicates a second top boundary, a second bottom boundary, a second left boundary and a second right boundary.

Example 4 includes the subject matter of any of Examples 1 through 3, wherein if said text line has a respective probability greater than a predetermined threshold, the method includes associating said text line with a borderless table object, wherein said associating further comprises: if said text line overlaps with an existing borderless table object, associating the existing borderless table object with said text line; and, if said text line does not overlap with an existing borderless table object, creating a new borderless table object and associating said text line said new borderless table object.

Example 5 includes the subject matter of Example 3 or 4, wherein determining whether said text line overlaps with an existing respective borderless table object is determined based upon said first boundary property and said second boundary property.

Example 6 includes the subject matter of any of Examples 3 through 5, wherein associating said text line with a borderless table object is further based upon said text line having a horizontal overlap with said borderless table object, said text line being below a bound of said borderless table object and a height of said text line being within a predetermined threshold of an average height of text lines associated with said borderless table object.

Example 7 includes the subject matter of any of the previous Examples, wherein said classification is a logistic regression.

Example 8 is a computer program product including one or more non-transitory machine readable mediums encoded with instructions that when executed by one or more processors cause a process to be carried out for detecting borderless tables in a fixed-format structured document, the process comprising: generating a sorted list based upon a vertical and horizontal position of a text line within said document; and performing a respective classification to determine a respective probability that said text line belongs to a borderless table. If said text line has a respective probability greater than a predetermined threshold, the process includes associating said text line with a borderless table object; and, if said text line has a respective probability less than said predetermined threshold, the process includes associating said text line with a borderless table object that intersects said text line.

Example 9 includes the subject matter of Example 8, wherein each of said respective borderless table objects is associated with a first boundary property, wherein said first boundary property indicates a first top boundary, a first bottom boundary, a first left boundary and a first right boundary.

Example 10 includes the subject matter of Example 9, wherein said text line is associated with a second boundary property, wherein said second boundary property indicates a second top boundary, a second bottom boundary, a second left boundary and a second right boundary.

Example 11 includes the subject matter of any of Examples 8 through 10, wherein if said text line has a respective probability greater than a predetermined threshold, the process includes associating said text line with a borderless table object, wherein said associating further comprises: if said text line overlaps with an existing borderless table object, associating the existing borderless table object with said text line; and, if said text line does not overlap with an existing borderless table object, creating a new borderless table object and associating said text line said new borderless table object.

Example 12 includes the subject matter of Example 10 or 11, wherein determining whether said text line overlaps with an existing respective borderless table object is determined based upon said first boundary property and said second boundary property.

Example 13 includes the subject matter of any of Examples 10 through 12, wherein associating said text line with borderless table object is further based upon at least one of said text line having a horizontal overlap with said borderless table object, said text line being below a bound of said borderless table object and a height of said text line being within a predetermined threshold of an average height of text lines associated with said borderless table object.

Example 14 includes the subject matter of any of Examples 8 through 13, wherein said classification is a logistic regression.

Example 15 is a system for or detecting borderless tables in a fixed-format structured document. The system includes a processor, wherein the processor is adapted to: generate a sorted list based upon a vertical and horizontal position of a text line within said document; and perform a respective classification to determine a respective probability that said text line belongs to a borderless table. If said text line has a respective probability greater than a predetermined threshold, the processor is adapted to associate said text line with a borderless table object; and, if said text line has a respective probability less than said predetermined threshold, the processor is adapted to associate said text line with a borderless table object that intersects said text line.

Example 16 includes the subject matter of Example 15, wherein said processor is further adapted to associate each of said borderless table objects with a first boundary property, wherein said first boundary property indicates a first top boundary, a first bottom boundary, a first left boundary and a first right boundary.

Example 17 includes the subject matter of Example 16, wherein said processor is further adapted to associate said text line with a second boundary property, wherein said second boundary property indicates a second top boundary, a second bottom boundary, a second left boundary and a second right boundary.

Example 18 includes the subject matter of Example 17, wherein said processor is further adapted to: if said text line overlaps with an existing borderless table object, associate said existing borderless table object with said text line; and, if said text line does not overlap with an existing borderless table object, create a new borderless table object and associate said text line said new borderless table object.

Example 19 includes the subject matter of Example 17 or 18, wherein said processor is further adapted to determine whether said text line overlaps with an existing respective borderless table based upon said first boundary property and said second boundary property.

Example 20 includes the subject matter of any of Examples 17 through 19, wherein, wherein said processor is further adapted to associated said text line with borderless table object based upon at least one of said text line having a horizontal overlap with said borderless table object, said text line being below a bound of said borderless table object and a height of said text line being within a predetermined threshold of an average height of text lines associated with said borderless table object.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A computer implemented method for detecting borderless tables in a fixed-format structured document, the method comprising:
    generating a sorted list of a plurality of text lines within a document, wherein the list is sorted based upon a vertical position and a horizontal position of each text line in the sorted list;
    determining a first respective probability that a first text line belongs to a borderless table that comprises first and second borderless table objects, wherein the first text line comprises a plurality of words, wherein each pair of adjacent words in the first text line is separated by a word gap, wherein the first text line comprises a set of one or more word gaps, and wherein the first respective probability is determined based, at least in part, on a feature selected from a group consisting of:
        an average word gap in the set,
        a standard deviation of the word gaps in the set,
        a sum of the word gaps in the set,
        a number of words in the first text line containing fewer letters than numbers, and
        a ratio of words in the first text line containing numbers to a total quantity of words in the first text line;
    determining a second respective probability that a second text line belongs to the borderless table;
    making a first determination that the first respective probability is greater than a predetermined threshold, and in response to making the first determination, designating the first text line as belonging to the borderless table and associating said first text line with the first borderless table object; and
    making a second determination that (a) the second respective probability is less than said predetermined threshold, and (b) the second text line intersects the second borderless table object, and in response to making the second determination, designating the second text line as belonging to the borderless table and associating said second text line with the second borderless table object.

2. The method according to claim 1,
    wherein said first borderless table object is associated with a first borderless table object boundary property, and
    wherein said first borderless table object boundary property indicates a first borderless table object top boundary, a first borderless table object bottom boundary, a first borderless table object left boundary and a first borderless table object right boundary.

3. The method according to claim 2,
    wherein said first text line is associated with a first text line boundary property, and
    wherein said first text line boundary property indicates a first text line top boundary, a first text line bottom boundary, a first text line left boundary and a first text line right boundary.

4. The method according to claim 3, wherein associating the first text line with said first borderless table object further comprises determining that the first text line overlaps the first borderless table object.

5. A computer program product including one or more non-transitory machine readable mediums encoded with instructions that when executed by one or more processors cause a process to be carried out for detecting borderless tables in a fixed-format structured document, the process comprising:
    generating a sorted list of a plurality of text lines within a document, wherein the list is sorted based upon a vertical position and a horizontal position of each text line in the sorted list;
    determining a first respective probability that a first text line belongs to a borderless table that comprises first and second borderless table objects, wherein the first text line comprises a plurality of words, wherein each pair of adjacent words in the first text line is separated by a word gap, wherein the first text line comprises a set of one or more word gaps, and wherein the first respective probability is determined based, at least in part, on a feature selected from a group consisting of:
        an average word gap in the set,
        a standard deviation of the word gaps in the set,
        a sum of the word gaps in the set,
        a number of words in the first text line containing fewer letters than numbers, and
        a ratio of words in the first text line containing numbers to a total quantity of words in the first text line;
    determining a second respective probability that a second text line belongs to the borderless table;
    making a first determination that the first respective probability is greater than a predetermined threshold, and in response to making the first determination, designating the first text line as belonging to the borderless table and associating said first text line with the first borderless table object; and
    making a second determination that (a) the second respective probability is less than said predetermined threshold, and (b) the second text line intersects the second borderless table object, and in response to making the second determination, designating the second text line as belonging to the borderless table and associating said second text line with the second borderless table object.

6. The computer product according to claim 5,
    wherein said first borderless table object is associated with a first borderless table object boundary property, and
    wherein said first borderless table object boundary property indicates a first borderless table object top boundary, a first borderless table object bottom boundary, a first borderless table object left boundary and a first borderless table object right boundary.

7. The computer product according to claim 6,
wherein said first text line is associated with a first text line boundary property, and
wherein said first text line boundary property indicates a first text line top boundary, a first text line bottom boundary, a first text line left boundary and a first text line right boundary.

8. The computer product according to claim 7, wherein associating the first text line with said first borderless table object further comprises determining that the first text line overlaps the first borderless table object.

9. The computer product according to claim 8, wherein determining that the first text line overlaps with the first borderless table object is based upon said first borderless table object boundary property and the first text line boundary property.

10. The computer product according to claim 7, wherein associating said first text line with the first borderless table object is based upon said first text line having a horizontal overlap with said first borderless table object, and a height of said first text line being within a predetermined threshold of an average height of a plurality of text lines associated with said first borderless table object.

11. The computer product according to claim 5, wherein the first and second respective probabilities are determined using logistic regression.

12. The computer product of claim 5, wherein:
the first respective probability is determined based further on a quantity of soft lines intersecting the first text line; and
a soft line is a vertically-oriented white space element that occurs when multiple white spaces in adjacent text lines are aligned vertically.

13. A system for detecting borderless tables in a fixed-format structured document, said system comprising a processor that is adapted to:
generate a sorted list of a plurality of text lines within a document, wherein the list is sorted based upon a vertical position and a horizontal position of each text line in the sorted list;
determine a first respective probability that a first text line belongs to a borderless table that comprises first and second borderless table objects, wherein the first respective probability is determined based, at least in part, on a feature selected from a group consisting of a number of verbs present in the first text line and a lack of punctuation present in the first text line;
determine a second respective probability that a second text line belongs to the borderless table;
make a first determination that the first respective probability is greater than a predetermined threshold, and in response to making the first determination, designate the first text line as belonging to the borderless table and associate said first text line with the first borderless table object; and
make a second determination that (a) the second respective probability is less than said predetermined threshold, and (b) the second text line intersects the second borderless table object, and in response to making the second determination, designate the second text line as belonging to the borderless table and associate said second text line with the second borderless table object.

14. The system according 13,
wherein said first borderless table object is associated with a first borderless table object boundary property, and
wherein said first borderless table object boundary property indicates a first borderless table object top boundary, a first borderless table object bottom boundary, a first borderless table object left boundary and a first borderless table object right boundary.

15. The system according to claim 14,
wherein said first text line is associated with a first text line boundary property, and
wherein said first text line boundary property indicates a first text line top boundary, a first text line bottom boundary, a first text line left boundary and a first text line right boundary.

16. The system according to claim 15, wherein associating the first text line with said first borderless table object further comprises determining that the first text line overlaps the first borderless table object.

17. The system according to claim 16, wherein determining that the first text line overlaps with the first borderless table object is based upon said first borderless table object boundary property and the first text line boundary property.

18. The system according to claim 15, wherein associating said first text line with the first borderless table object is based upon said first text line having a horizontal overlap with said first borderless table object, and a height of said first text line being within a predetermined threshold of an average height of a plurality of text lines associated with said first borderless table object.

* * * * *